June 12, 1934.  F. RUMPF  1,962,619
EXCHANGE SYSTEM FOR ELECTRICAL COMMUNICATIONS
Filed June 2, 1932  6 Sheets-Sheet 1

Inventor
FRITZ RUMPF
By Dowell & Dowell
Attorneys

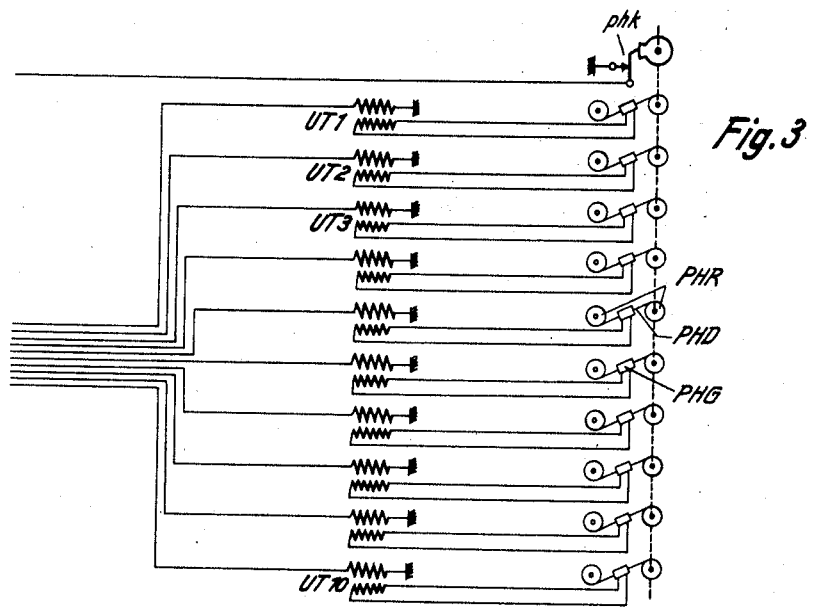
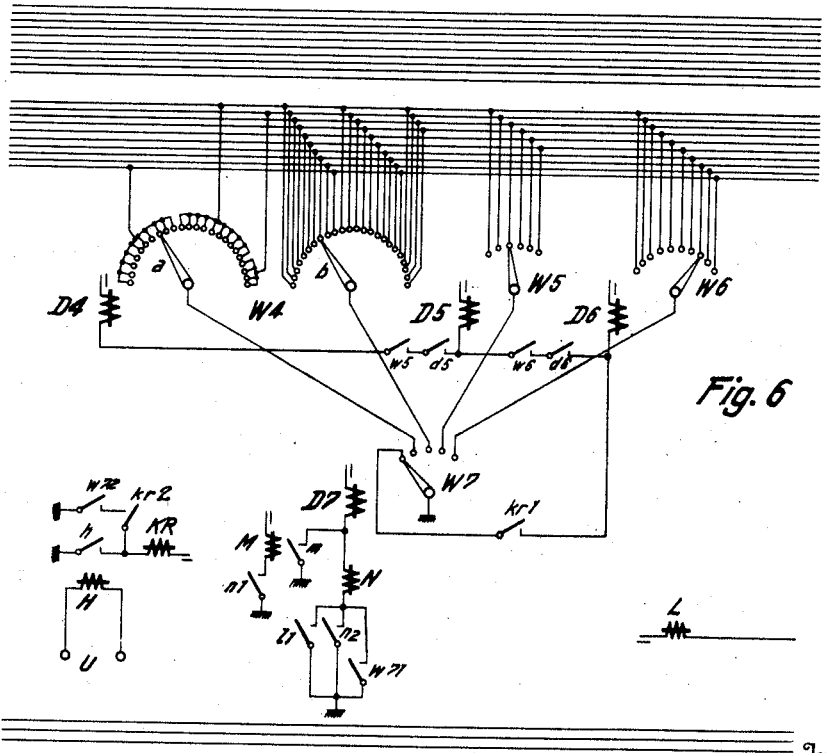

June 12, 1934.    F. RUMPF    1,962,619
EXCHANGE SYSTEM FOR ELECTRICAL COMMUNICATIONS
Filed June 2, 1932    6 Sheets-Sheet 5
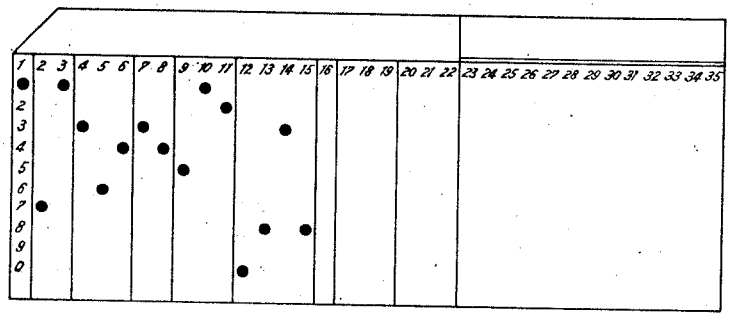
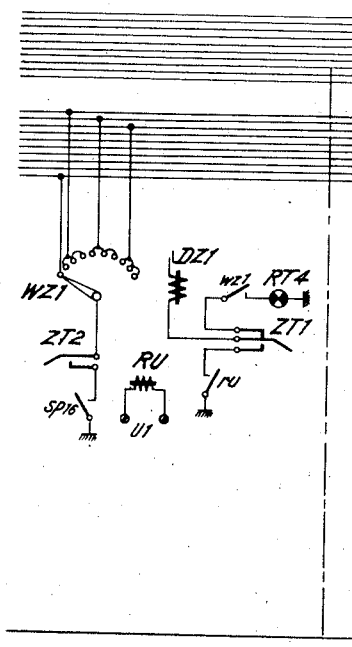
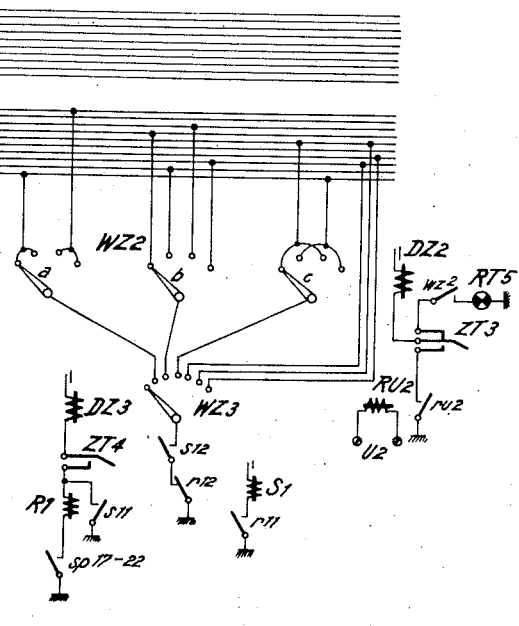
Inventor
FRITZ RUMPF
By Dowell and Dowell
Attorneys.

June 12, 1934.  F. RUMPF  1,962,619
EXCHANGE SYSTEM FOR ELECTRICAL COMMUNICATIONS
Filed June 2, 1932    6 Sheets-Sheet 6

Inventor
FRITZ RUMPF
By Dowell and Dowell
Attorneys.

Patented June 12, 1934

1,962,619

UNITED STATES PATENT OFFICE 1,962,619

EXCHANGE SYSTEM FOR ELECTRICAL COMMUNICATIONS

Fritz Rumpf, Bern, Switzerland

Application June 2, 1932, Serial No. 615,022
In Switzerland June 2, 1931

11 Claims. (Cl. 179—7.1)

The present invention relates to toll telephone systems and the like which are provided with devices for recording the essential particulars, such as origin, determination and scope of the connections. These particulars must be recorded so as to provide a basis for the production of the connection, and to give the necessary information, also as to later make a charge with a corresponding cost to the originating station according to the connection which has been made. For example, this requirement occurs in the exchanges for the production of distant telephone toll connections. In the usual course, the statements regarding origin and the determination of the connections which take place in such a case are transmitted orally by the calling subscriber to an operator who makes note thereof on a card which is then transmitted to the various stations.

Suggestions have already been made to directly record in writing the particulars of the number of the subscriber to be called, and of the calling subscriber, and for this purpose to set up a type printing device by a series of current impulses transmitted by the subscriber. In this manner, a portion of the manipulations which are to be effected in the transmitting stations can be simplified. For carrying out the recording however, it is necessary to have a number of separate station operators, which considerably influences the personnel of the distributing stations. It is particularly necessary that all the operations which have to do with the calculation of the connection, (i. e. the determination of the charge to be made for a communication of a particular scope and making this particular charge) are made by separate personnel.

It is the object of the present invention to simplify these operations. For this reason the exchange is provided with recording devices, with perforator punches, which by means of a perforation which always remains uniform and which is effected according to importance at different points of a perforator card, vary these perforator cards in such manner that they can be set to the required value automatically. The perforator cards which are perforated according to the invention may then be calculated in known automatically operable storing and calculating devices according to the most diverse points of view, so that particularly the entire calculating operation is effected mechanically. According to the construction of the exchange, the recording can also be used for automatically building up the desired connection in that, for example, according to the recordings, series of current impulses are transmitted by which selectors are set. It is also possible dependently on the varied recording elements to transmit the information necessary for building up a communication, for example, to an operator.

The variation of the perforator cards by means of a perforation which always remains constant and which is effected solely according to its importance at various stations of the card, has the advantage that the calculations of the variations which have taken place can be effected in a particularly simple manner. The perforator cards are divided into separate columns, each column of which may be provided with an aperture at ten different points. Such apertured cards are used in the known Holorith system, and for their calculation there may then be used the known tabulating machines of the Holorith system.

The devices for effecting the remaining and an automatic calculation of the variations of the recording elements which have taken place are fairly complicated and, therefore, comparatively expensive machines. In order to enable these devices to be used completely in the varying intensity of traffic occurring at the distributing stations, there are used according to the invention register selectors which receive and store the variations in current which transmit the particulars to be recorded. In this manner it is possible to provide a card perforator, or if desired, a number of perforator devices, and thus also balance the periodic differences in the operation of the perforator devices and of the register selectors.

In the accompanying drawings is illustrated an example of the invention.

Figures 1 and 2 jointly show a register set for storing the current impulses, these being placeable together to illustrate the complete unit.

Figure 3 shows a device for phonetically calling back the setting of the register selectors.

Figures 4 and 5 respectively show a perforating device and a conveying device.

Figure 6 shows a register set for transmitting the time value.

Figure 8 shows a perforated card.

Figure 9 shows a register set for transmitting the number value.

Figure 10 shows a register for transmitting the number values arranged according to calculated amounts.

Figure 7:
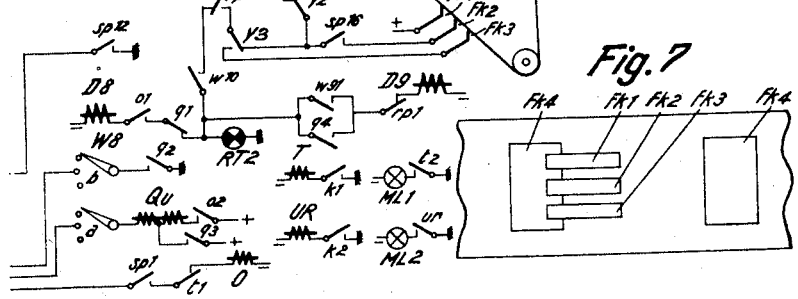
Figure 7 shows a partial view of the conveyor band.

The several views have been drawn to a uniform scale in relation to each other, it being impossible to illustrate the entire organization on a single sheet. The best understanding of the exemplary system and the various circuits will therefore be had by arranging sheets 1 to 5 side by side consecutively from left to right, so that Fig. 2 will line up with Fig. 1; Figs. 3 and 6 will line up with Fig. 2; Figs. 9 and 10 will line up with Fig. 6 and Figs. 4 and 7 will line up with Fig. 10.

Figure 1:
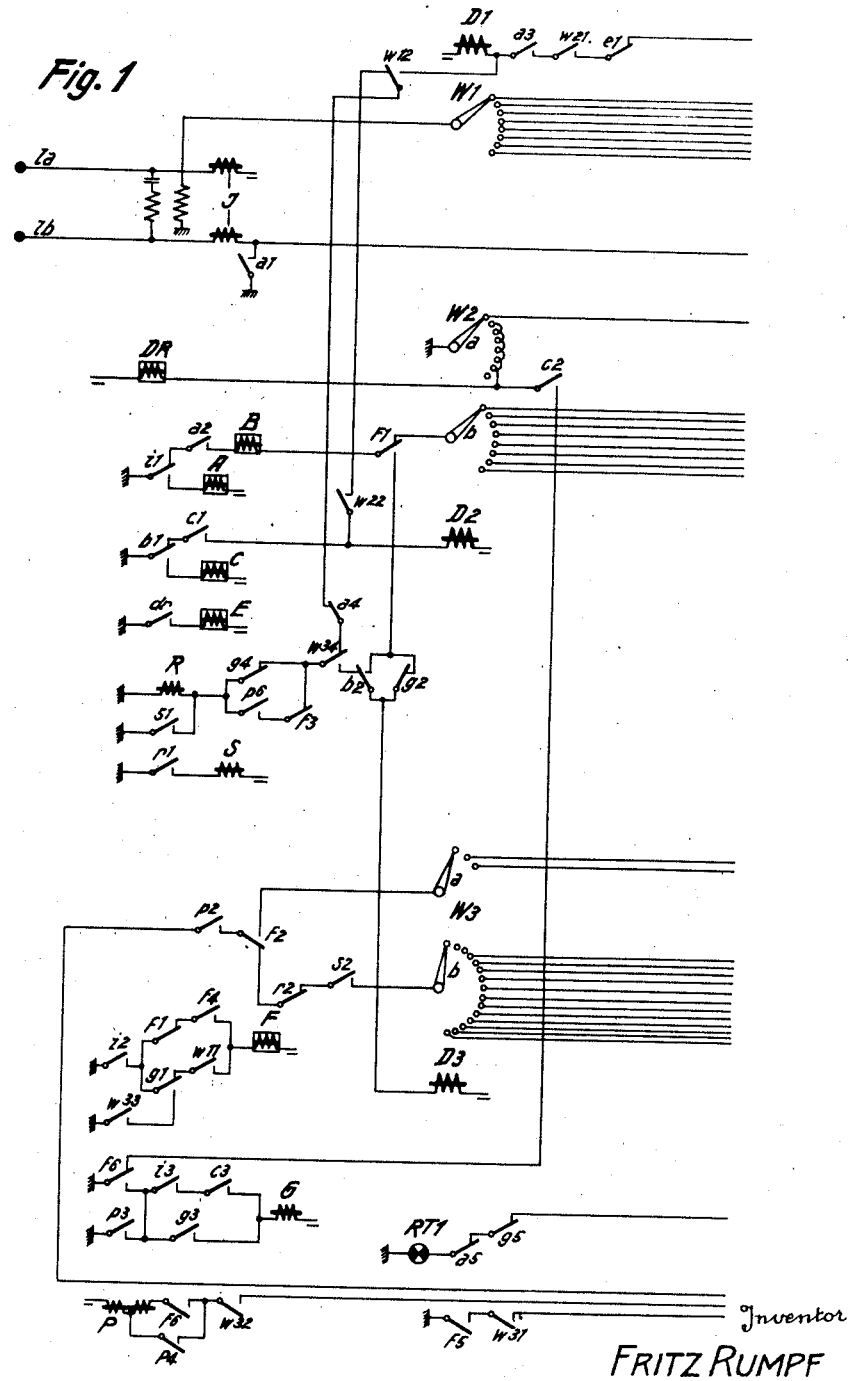
Figure 2:
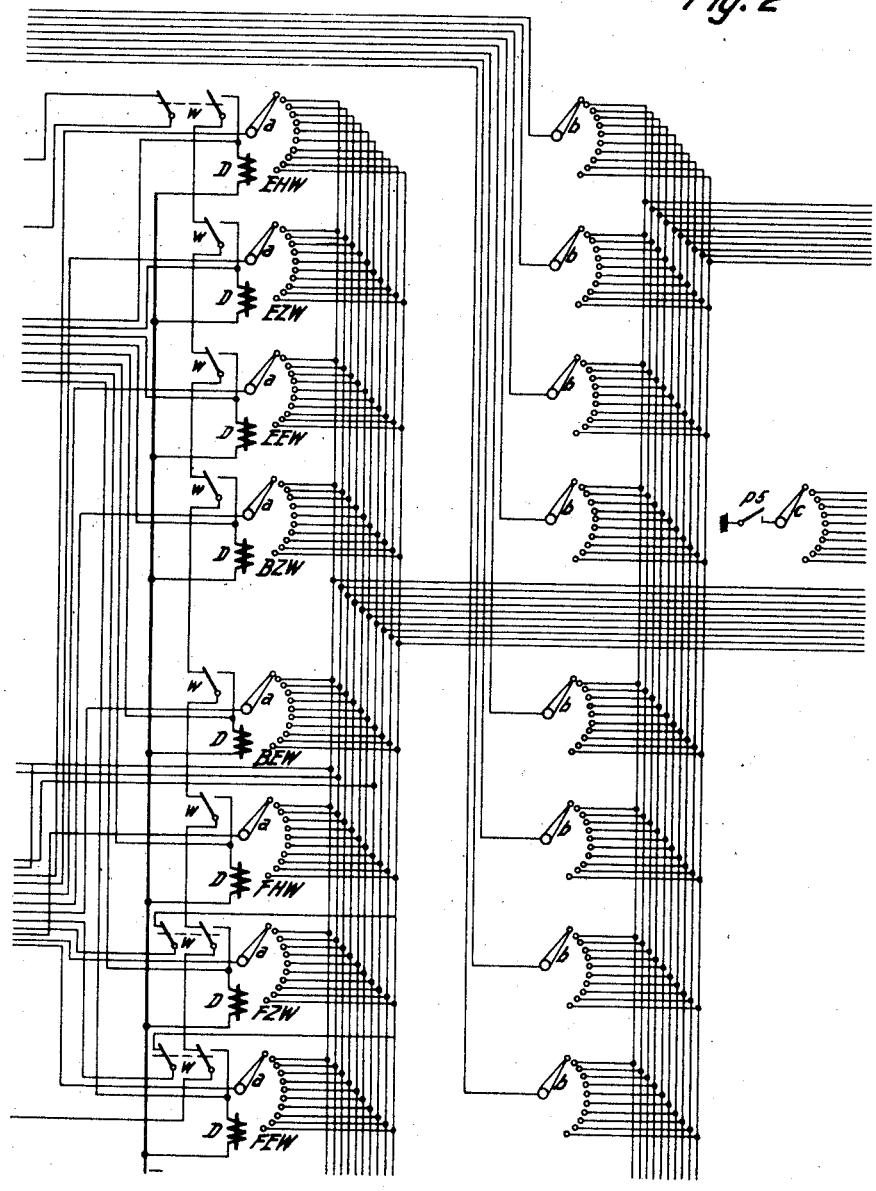
Figure 4:
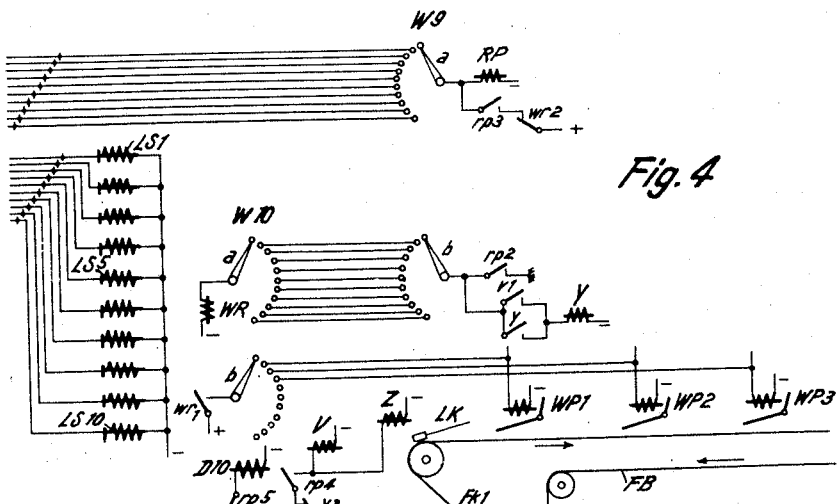

In Figures 1 and 2 is illustrated a register set for receiving the series of current impulses which give a file reference of the origin and the determination of a connection. Figure 3 shows a further register set for recording the accurate clock time at any moment, whereas Figure 4 shows a device for perforating the cards according to the setting of the various registers and for dividing or distributing the cards to different operator's positions.

The registering set in Figures 1 and 2 is reached through the lines 1a, 1b. These lines may, for example, be connected to the group selector of an automatic telephone exchange which is set by the calling subscriber by current impulses. They may also be connected at an operator's position, the operator of which, for example, transmits the necessary particulars which he has received orally from the calling subscriber.

When the line 1a, 1b is busy there responds a relay J which by means of contact i1 energizes a delayed acting relay A. For setting the selectors EHW and FEW (Figure 2) of the register set, periodic interruptions are made over the lines 1a, 1b in the current flowing through the relay J. It is assumed that, as is usual in automatic telephone installations, each series of current impulses consists of a maximum of ten current interruptions. The separate series of current impulses which are transmitted successively each act on a selector EHW, EZW to FEW (Figure 2). For recording the number of the calling subscriber, there are provided the selectors EHW, EZW, EEW, the number of the determining station of the connection is stored in the selectors BZW, BEW and the number of the called subscribers in the selectors FHW, FZW, FEW. A selector W2 (Figure 1) is provided in order to distribute the series of current impulses to the separate selectors in Figure 2. The first series of current impulses passes through the circuit: +, i1, a2, relay B, f1, switch arm b of the selector W2, rotary magnet D of the selector EHW to —.

During the transmission of the current impulses the delayed acting relay B is energized which by means of its contact b1 energizes the delayed acting relay C. After the series of current impulses the relays B and C fall successively with a delayed action. A circuit for the rotary magnet D2 of the selector W2 is thus closed for a short time through +, b1, c1, D2, —.

In this manner the switch arms a and b of this selector are advanced through one step, so that the impulse circuit for the rotary magnet D of the selector EZW is prepared. As soon as the switch arms of the selector W2 leave the rest position there is closed a contact w21, actuated by the shaft of the selector, in the circuit of the rotary magnet D1 of a selector W1. The closing of the contact w21, however, at this moment has no action as through the medium of the switch arm a of the selector W2 the delayed acting relay DR is energized which by means of its contact d, r, energizes the delayed acting relay E. Relay E breaks with contact e1 the said circuit of the rotary magnet D1. After the eight selectors in Figure 2 have been set successively by eight successive series of current impulses then on the further forward movement of the selector W2 the switch arm a leaves the contacts connected to the relay DR. The relay DR falls with a delay action by reason of its delay in falling and opens at contact dr the circuit of the relay E which also falls. In this manner there is prepared the circuit for the rotary magnet D1 of the selector W1.

In order that the station transmitting the series of current impulses can be convinced as to the correct setting of the register selectors EHW to FEW there is provided a device for referring this setting back phonetically. The register selectors EHW to FEW always carry a second switch arm b. After setting the register selectors all these switch arms rest on contacts which are connected together by a multiple conductor formed of ten lines. Each line of this multiple leads to a transformer coil UT1 to UT10 (Figure 3). The secondary windings of these transformers are connected to electro-magnetic receiving devices PHG. There are provided ten steel wires PHD which are all wound on two rollers PHR. These steel wires are magnetized in the known manner and each has marked thereon one of the numbers 1–0. On the passage of the steel wire marked with the number 1 there is produced in the receiving device PHG an induction current which is adapted to cause the number 1 to be sounded just once in a telephone receiver. The rollers PHR of all the ten electro-magnetic receiving devices PHG are continuously moved backwards and forwards by a common driving device so that by known means, not illustrated, the receiver PHG is prevented from being influenced by the return movement. During each to and fro movement of the common driving device shaft there is closed once the contact phk which is included in the circuit of the rotary magnet D1 of the selector W1 (Figure 1).

The switch arm of the selector W1 is connected to a transformer coil UTII of which the secondary winding is located in the lines 1a, 1b. As soon as the circuit of the rotary magnet D1 is prepared as above described (after the fall of the relay E), then on the next closing of the contact phk the rotary magnet is energized and the switch arm of the selector W1 is advanced by one step. The switch arm of the selector W1 now rests on a contact which is connected to the switch arm b of the register selector EHW. A connection is now produced between the transformer coil UTII and the transformer coil on the line of which the register selector EHW was set by the first series of current impulses transmitted, for example the coil UT3, and the number 3 is transmitted once through the transformer coil UTII over the line 1a, 1b and becomes operative in the receiver of the subscriber. After the completion of this transmission the contact phk (Figure 3) is again closed for a short time and the selector W1 is moved forward to the next step so that successively the setting of all the register selectors is obtained and communicated electro-acoustically, to the subscriber. The subscriber can thus be convinced as to the correct setting of the register selectors (Figure 2). If he notices an error in the setting, he may disengage the connection to the register by interrupting the line 1a, 1b whereby all the selectors which have been set will return to the rest position after the relays J and A have fallen.

However, if the subscriber is satisfied as to the accuracy of the setting of the register selector, he abandons this setting by a separate operation and thus at the same time initiates the perforating of the card recordation according to the setting of the register selectors. The giving of this sustaining signal is effected by a renewed transmission of a series of current impulses, the number of such impulses of this series being controlled or used to give a signal for the type of connection desired, for example, according to whether an ordinary or urgent connection is wished.

During the rotation of the selector W1 (Figure 1) for transmitting the electro-acoustic return message, the contact w11, which is actuated by the shaft of the selector w1 remained closed so that in the circuit: $+$ i2, g1, w11, relay F, $-$ the delayed acting relay F was energized. By means of its contact f4, the relay F has closed for itself a holding circiut: $+$ i2, p1, f4, relay F, $-$.

By the contact f1, the impulse circuit has been changed over so that now the series of current impulses transmitted by the subscriber as sustaining signal passes into the circuit: $+$ i1, a2, relay B, f1, g2, rotary magnet D3 of the selector W3. In this manner the selector W3 is for example set on the first contact, while at the same time the contacts w31 to w34 are changed over. As in the previously described manner, during the transmission of this series of current impulses the relay delayed acting C is energized, there is formed for the duration of this transmission also an energizing circuit for the relay G: $+$, f6, i3, c3, relay G, $-$. Relay G immediately locks itself through its contact g3. At the same time the rotary magnet D2 has received a current impulse and moved the selector W2 into the rest position in which the contact w21 is opened, so that the rotary magnet D1 of the selector W1 can no longer respond.

Figure 5:
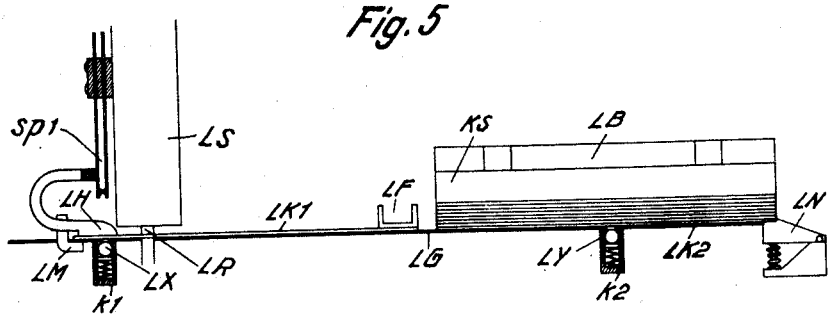

Over contacts f5 and w31 there is now closed a starting circuit for a perforating device. This perforating device is illustrated in Figure 4, whilst Figure 5 shows the principal mechanical device of the perforator. The perforating device is provided with a guide surface LG (Figure 5) on which the perforator cards come to lie in succession. On the righthand side of this guide surface is provided a rack for cards KS, in which there are stacked the cards which are pressed against the guide surface LG by a weighting device LB. A spring actuated projection LN engages with the righthand narrow edge of the lowermost perforated card LK2 in such manner that on a movement of the projection LN to the left by means not illustrated in the drawings, only a single card can be moved.

Above the guide surface LG are provided a plurality of plungers LR arranged in a row one behind the other and of which only one is shown in the drawings. The plungers each are operated by an electro-magnet LS which when energized forces the plunger through the card. Above the guide surface LG is also provided a guide LF under which is passed the card which is moved forwardly by the projection LN. In the drawings, Figure 5 shows how the projection LN has moved a card LK1 under the plungers. The projection however is shown already moved backwardly to the right and engaging another perforated card LK2.

The card LK1 is engaged at its left hand narrow edge by the lever LH by means of a counter member LM. At the same time the contact sp1 has been closed by the lever LH, which indicates that the card lies regularly in the perforator so as to be perforated in the column 1 (see Fig. 8). After each punching of a hole, the lever LH and the counter member LM move to the left on a feed device (not illustrated) and move the card LK1 forwardly through the width of one column. The contact sp1 is thus again opened. In the various positions of the feed device suitable contacts sp (not illustrated in Fig. 5) can be closed by cams of the feed drive which thus indicate that the card is in a position ready for perforation in a predetermined column.

After completing the perforating in the desired number of columns, the levers LH and the counter member LM are rocked in a manner not further illustrated and hold the card ready for discharge. An electro-magnet Z (Figure 4) is capable of removing the counter member LM from the lever LH, whereby the card is released and falls on the conveying device FB (Figure 4).

For watching the correct movement of the perforated cards under the plungers, further contacts are provided. Underneath the lever LH there is provided a spring actuated ball LX which comes to contact with the lever LH if no perforated card lies on the guide surface LG. In this manner the contact k1 is closed, the purpose of which will be described in connection with the description of the circuit shown in Figure 4. A similar contact k2 arrangement with a ball LY is provided underneath the stack of cards. This contact is closed as soon as there is no further card in the card stack KS. In the circuit of Figure 4, this contact appears as the contact k2 which energizes a relay UR by means of which a tell-tale lamp ML2 is switched in.

If a perforator card is regularly in the perforating device, that is to say, if the perforator is ready for perforating, the contact sp1 (Figure 4) is closed, while on the other hand the contact k1 is opened and the relay T is not energized. In the starting circuit closed over the contacts f5, w31 (Figure 1), the relay O (Figure 4) is energized. The contact o1 closes the circuit for the rotary magnet D8 of a selector W8 through which the perforating device is connected, to the set register set: $+$, switch RT2, q1, o1, rotary magnet D8, $-$. At the same time, the test relay QU is temporarily switched in through the contact o2. As soon as the switch arm a of the selector W8 strikes against the line leading to the set register, Figure 1, the following circuit is formed: $-$, relay P, f6, w32 (Fig. 1) switch arm a of the selector W8, relay QU o2, $+$ (Fig. 2). In this circuit there respond both the relay P and the relay Qu. Relay Qu locks itself independently of the relay O by closing the contact q3. By contact q2 $+$, potential is placed on the set register set through the switch arm b of the selector W8. At the same time contact q4 closes the circuit for the rotary magnet D9 of a selector W9: $+$, switch RT2, q4, $rp1$, rotary magnet D9, —. The switch arms $a$ and $b$ of the selector W9 are thus moved forwardly. The contacts over which the switch arm $a$ passes are directly connected to the contacts over which passes the switch arm $c$ of the register selector BZW (Figure 2). As soon as the switch arm $a$ of the selector W9 (Figure 4), meets the contact over which passes the switch arm $c$ of the selector BZW, the relay RP responds, stops the selector W9 by opening contact $rp1$ and closes by means of contact $rp3$ a holding circuit for its own winding. Simultaneously with the energization of the relay Qu the relay P in the register set (Fig. 1) was energized. By opening the contact $p1$, relay P has opened the circuit of relay F which falls with a delayed action. By contact $p2$, there is held closed until the fall of relay F a circuit for the first perforation: +, $q2$ (Figure 4), switch arm $b$ of the selector W8, $p2$ (Figure 1), $f2$, switch arm $a$ of the selector W3, line 1 of the perforating multiple, perforating plunger magnet LS1 (Figure 4) —, so that in the column 1 of the perforated card there is punched a hole at a position corresponding with the position 1 and the perforated card is fed forwardly to the column 2. The energizing of the relay P (Fig. 1) is also maintained after the fall of the relay F through the contact $p4$ and the energizing of the relay G through contact $p3$. After the fall of the relay F, a circuit for the automatic feed of the selector W3 is closed by closing the contact $f3$, +, relay R, $p6$, $f3$, $w34$, $b2$, rotary magnet D3,—. In this circuit there is first energized relay R which with its contact $r1$ energizes relay S; relay S short circuits by means of contact $s1$ relay R, therefore amplifies the current in such a manner that the rotary magnet D3 can respond and feed the selector W3 forwardly, whereupon after the fall of relay R, relay S also again falls. Both relays, therefore, act as relay switches. By contacts $r2$ and $s2$, a plus potential is applied for a short time simultaneously at each setting of the switch arm $b$ of the selector W3 on a contact to the switch arm and thus energizes the perforating plunger magnet LS connected to the contact through the multiple. The switch arm $b$ of the selector W3 first meets two contacts which are rigidly connected with the perforating multiple so that each time selector W3 is brought into use an unchangeable perforating of the cards is effected. These two contacts correspond with the number of the district of the subscriber who has set the register selectors. In this connection it is assumed that a register set is always reached only by subscribers from the same district. After perforating these points, the switch arm $b$ of the selector W3 engages successively with the switch arm $a$ of the register selectors EHW, EZW, EEW, BZW, BEW and thus produces a perforation of the card corresponding with the setting of the selectors in the succeeding columns. The next step of the selector W3 is not connected with the switch arm $a$ of the selector FHW of the register set, but passes directly over a shaft contact controlled by the shaft of the last register selector FZW to the tenth line of the multiple. In a similar manner the succeeding contact of the selector W3 passes over a contact controlled by the shaft of the register selector FZW to the tenth line of the perforating multiple. These connections are only closed when the two register selectors FZW and FEW were not set. The register selectors FHW, FZW and FEW storing the number of the called subscriber, which in the maximum case is assumed to be a three position number, enables the arrangement described also to effect a regular perforating, even when only the selector FHW or only the selectors FHW and FZW have been set, the called subscriber thus not having a three position but only a single or two position number. As in this case, for example, the selector FEW is not set, a zero is perforated automatically before the perforation of the registered number so that the number stored in the register set appears automatically in the correct columns of the perforated card.

After the switch arm $b$ of the selector W3 has also engaged the switch arm $a$ of the last register set selector FEW, the selector W3 is returned by the last feed movement into its rest position and opens the contacts $w31$ to $w34$. The circuit through the relay P is thus broken so that now all the relays of the register set will fall, while the separate register selectors return through the change over shaft contacts into their position of rest. The energization of relay J was already after the transmission of the last series of current impulses serving as the sustaining signal, interrupted by interrupting the line by the calling subscriber, as from this moment no further operations can take place over the lines $1a$, $1b$ and the setting of the register selectors is maintained until complete delivery to the perforating device.

After the complete transmission of the setting of the register selectors to the perforating device, the perforated card (see Fig. 8) in the assumed example is perforated successively in eleven columns. In the first column there is effected the perforation of the sustaining signal, in the second and third the perforation of the definitely set number of the district of the calling subscriber, in the fourth to sixth the perforation of the actual number of the calling subscriber, in the seventh and eighth the number of the district of the called subscriber and in the ninth and eleventh the number of the called subscriber. There remains then under the plungers, the column 12 of the perforated card and consequently the contact $sp12$ (Figure 4) is closed. A relay L (Figure 6) is thus energized. In Figure 6 is illustrated a register set consisting of the selectors W4 to W7. This register set serves to permit an accurate time perforation to be effected at any moment.

To the terminals U (Fig. 6) is connected a line, not shown, over which a current impulse is transmitted every minute by a main clock. This current impulse energizes relay H which in turn energizes relay KR by contact $h$. Over contact $kr1$, there is energized with every minute current impulse the rotary magnet D6 of the register selector W6 which thus switches this selector forwardly through one step. The rotary magnet D6 when energized actuates a contact $d6$. This contact closing, however, is non-effective until at the ninth step of the register selector W6, when the contact $w6$ actuated by a cam on this shaft, is closed. The succeeding feed impulse then acts on the rotary magnet D6 of the selector W6 and on the rotary magnet D5 of the selector W5, so that the switch arm of the selector W6 is moved from the ninth to the zero step and simultaneously the switch arm of the selector W5 is moved through a further step. The register selector W5 serves for indicating the tens position and the register selector W6 for indicating the units position of any minute value.

The rotary magnet D5 also actuates each time it is energized, a contact $d5$, which however, remains inoperative until in its fifth position, when the contact $w5$ is closed by a cam on the shaft.

The succeeding minute impulse now acts on all three rotary magnets D4 to D6. The register selector W4 serves for indicating the hour value at any time. It carries two switch arms. The switch arm $a$ sweeps over a contact field of which the first ten contacts are connected with the line of the perforating multiple to which the perforating magnet LS10 (Figure 4) is connected. The next ten contacts are connected to the perforating magnet LS1 and the remaining four contacts to the perforating magnet LS2.

The contacts over which the switch arm $b$ of the register selector W4 sweeps are successively connected to the lines which lead to all the perforating magnets LS1 to LS10. By reason of the minute feed of the register selectors W4 to W6, the setting of their switch arms always corresponds with the actual time. In the example illustrated, the time is 08 hours 38 minutes.

As soon as the relay L (Figure 6) is energized when closing the contact $sp12$ (Figure 4), there is closed for the rotary magnet D7 of a selector W7 a circuit: $+$, $l1$, relay N, rotary magnet D7, $-$.

In this circuit only the relay N responds, which by means of its contact $n1$ energizes relay M. Relay M by means of contact $m$ short circuits relay N, so that the rotary magnet D7 responds and feeds forward the switch arm of the selector through one step. Over the switch arm of the selector there is now formed a circuit which extends from $+$, switch arm of W7, switch arm $a$ of W4, perforating multiple, perforating magnet LS10 (Figure 4) to $-$. In the twelfth column of the perforated card there is, therefore, perforated the value zero and the card is conveyed into column 13. Although relay L now begins to fall, the feed of the magnet D7 of the selector W7 is maintained by the relay switch M, N as during the first step of the selector W7 the shaft contact $w71$ is actuated. The selector W7 successively engages with the separate switch arms of the selectors W4 to W6 and thus effects successively the perforating in accordance with the setting of these register selectors.

As on the first step of the selector W7, this breaks the feed circuit for the rotary magnets D4 to D6, and no setting of the register selectors can occur while a perforating is being carried out. If, while perforating, an impulse should be received through the line U, then the energization of the relay KR produced thereby is maintained until the selector W7 returns to its rest position after the completion of the perforating. Relay KR holds itself in a locking circuit which passes through its own contact $kr2$ and a contact $w72$ actuated by the shaft of the selector W7. The perforating itself requires very little time, so that as a rule the minute impulse which arrives over the line U is itself of longer duration than the single rotation of the selector W7.

As for recording the time value, four perforations are necessary, the column 16 of the perforated card is brought under the plungers after the completion of this recording. In this position the contact $sp16$ is closed. The perforated card is now to be removed from the perforating device and brought to an operator's position where the calculation of the recordings is effected, and any further recordings necessary take place. For distributing the perforated card to the separate operator's positions there is provided a continuously moving conveyor band FB (Figure 4). It is assumed that the criteria for the selection of an operator's position is determined by setting the register selector BZW (Figure 4) which is set according to the first position of the district number of the called subscribers. As above described the selector W9 when covering the perforating device has set itself on the line covered by the arm $c$ of the register selector BZW. The selector W9 has, therefore, taken over this setting of the selector BZW and maintains this after the register selectors (Figures 1 and 2) has returned to the rest position. The relay RP is thus energized.

On the conveyor band FB three sliding members $fk1$ to $fk3$ are adapted to slide. Into the conveyor band are woven contact members $fk4$ (Figure 7) which when passing the sliding members produce a metallic connection between the sliding members $fk1$ to $fk3$. For each operator's position there is provided a removing device which is operated electro-magnetically. Three such removing devices WP1 to WP3 are illustrated in the drawings (Figure 4). If, for example, the electro-magnet WP1 is energized, then a stripping device is pressed against the conveyor band FB which removes the incoming card.

The stripping devices WP1 to WP3 are arranged at uniform distances apart on the conveyor band FB and at the same intervals, metallic contact members $fk4$ are woven into the conveyor band. As soon as a contact member $fk4$ passes under the sliding members $fk1$ to $fk3$, a circuit for the relay V and the electro-magnet Z is closed as follows: $+$, $fk1$, $fk2$, $sp16$, $y2$, $rp4$, relay V, $-$ and magnet Z, $-$. Further, the circuit is also closed for the rotary magnet D10: $+$, $fk1$, $fk2$, $sp16$, $y3$, $rp5$, rotary magnet D10, $-$. The relay V responds and energizes over contact $v1$ relay Y which by means of contacts $y2$ and $y3$ again breaks the circuits just described. The magnet Z responds and in the manner above described withdraws the lever LH from the counter member LM (Figure 5) so that the card falls on the conveyor band and is carried away by this. The selector W10 makes one step.

By energizing the relay Y, there is now formed for the rotary magnet D10 another circuit which passes over contact $fk3$. This circuit is closed as soon as the next current impulse $fk4$ passes under the sliding members $fk1$ to $fk3$. The perforated card in the meantime has been conveyed to shortly before the stripping device WP1 of the first operating point. The selector W10 is thus advanced in synchronism with the conveyance of the perforated card on the conveyor band. Assuming that the register selector BZW had been set to the third contact, then the switch arms of the selector W9 have also been set on the third contact. As soon as the switch arm $a$ of the selector W10 has reached the third contact, relay WR is energized: $+$, $rp2$, switch arm $b$ of the selector W9, switch arm $a$ of the selector W10, relay WR $-$. By contact $wr1$ the stripping device WP3 of the third operating point is energized: $+$, $wr1$, switch arm $b$ of the selector W10, magnet WP3, $-$. As at this moment the card is shortly in front of the third operator's position it is now engaged by the stripping device, removed from the conveyor band and supplied to the operator's position.

By contact $wr2$, the holding circuit for relay RP is broken so that the selectors return into their rest position. The perforating device is already, independently of the reaching of the desired operator's position, released by the perforated card for the new perforations as the levers LH and LM immediately after the energizing of magnet Z have again moved into the ready position.

The perforated card which contains all the particulars necessary for producing a connection is now at that operator's position from which the desired connection can be built up. Such a perforated card is illustrated in Figure 8. By the operations previously described, perforations have been made in the columns 1 to 15, in column 1 the indication of the type of connection, whether ordinary or urgent, in columns 2 to 6 the figures of the district and the number of the calling subscriber, in columns 7 to 11 with figures of the district and the number of the called subscriber and in columns 12 to 15 the figures indicating the period of time of the call.

From these particulars, an operator is able to initiate the steps to effect a connection. This can be seen directly from the position of the holes in the separate columns. The card may also be allowed to pass through a transmitting device, and in this manner the perforations in the separate columns may be used for actuating acoustic or optical calling devices or directly for the production of current impulses which set the selectors necessary for the connection.

Figure 12:
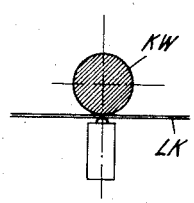
Figures 11 to 13 show different views of a transmitting device which is actuated by perforated cards.
Figure 11:
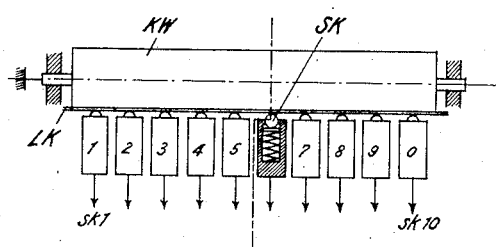
Figure 13:
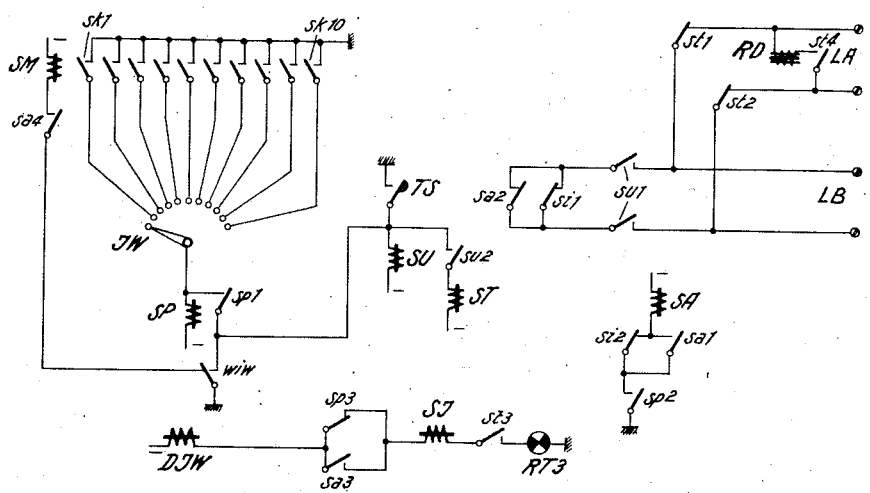
Figure 14:
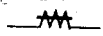
Fig. 14 illustrates the symbol used throughout the drawings to represent an ordinary relay.
Figure 15:
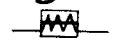
Fig. 15 illustrates the symbol used throughout the several views to represent a retardingly operated relay.
Figure 16:
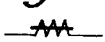
Fig. 16 illustrates the symbol used to represent the advance magnet of a selector.
Figure 17:
Fig. 17 illustrates the symbol used to represent the electro-magnet which actuates a hole punch.
Figure 18:
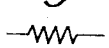
Fig. 18 illustrates the symbol used to represent a transmission winding.

Such a transmitting device is illustrated in Figures 11 to 13. It consists substantially of a row of ball contacts SK and a contact roller KW between which the perforated card LK is placed. In each column, one of the balls of the contacts SK passes through a perforation in the card and closes the contact. All the contacts sk1 to sk10 are connected to the stationary contacts of a selector JW (Figure 13). It is assumed that the line LA is connected to the operator's position, while the line LB leads to the selectors through which a connection is to be built up or over which signals for the operator are to be sent. If the operator desires to set the transmitting device into operation, the key TS is moved. The relay SU is thus energized and by means of its contacts su1 connects the line LB to the impulse contact si1 and by means of contact su2 energizes a relay ST which by means of its contacts st1 and st2 separates the line LA from the line LB. Contact st4 switches a choke coil RD into the line LA in order to hold any watching relays which are located in this line.

Contact st3 closes a circuit for the rotary magnet DJW of the selector JW: +, switch RT3, st3, relay SJ, sp3, rotary magnet DJW, —. In this circuit the rotary magnet is energized in steps and moves the arm of the selector JW in steps over the contacts of its contact bank. At the same time the relay SJ is also energized in stages and each time it is energized it opens the impulse contact si1, so that the current flowing in the line LB is interrupted in stages. During the first step of the selector JW, a contact wiw, actuated by its shaft, is changed over so that the relay SU is held independently of the actuation of the key TS. During each step of the selector KW the circuit over the line LB is broken once. As soon as the switch arm meets the contact which through the closed contact sk is connected to the plus pole of the battery, relay SP responds and with its contact sp1 closes its own holding circuit. Contact sp2 prepares a circuit for energizing relay SA, which is closed immediately after the fall of relay SJ, so that relay SA responds. Contact sp3 opens the circuit for the rotary magnet DJW, rate operator's positions there is provided a contact sa3 in order to enable the selector to move further into its rest position. During this further movement, contact sa2 short circuits the impulse contact si1, so that the subsequent energizations of the relay SJ do not produce any current interruptions in the line LB. The contact sa4 prepares a circuit for the magnet SM which is closed through the shaft contact wiw as soon as the selector JW has returned to the rest position. The magnet SM responds and feeds the perforated card by the amount of a column, so that now current impulses can be transmitted according to the perforations of this column.

This transmitting device can be used directly for building up the connection to the called subscriber and to the calling subscriber. In this case it is preferable to stack the perforated cards at the working point and to allow them to pass automatically through the transmitting device when the distant line becomes free. The impulses transmitted by the transmitting device may also be used for setting selectors through, which, in a manner similar to the case with the arrangement described in Figures 1 to 3, the operator at the operator's position can be advised phonetically as regards the meaning of the perforation of the card, or through its switch arms, lamps can be switched on for optically indicating the meaning of the card perforations.

If, for example an operator has manually built up the desired connection to the called subscriber and to the calling subscriber, then it is necessary to record the duration of this connection. The duration of the connections may be counted according to speech units, and each speech unit may amount for example, to three minutes. In order to transfer the result of this counting automatically to a perforated card, there is provided a register selector WZ1, constructed as a time counter, which is illustrated in Figure 9. When communication commences, the operator presses the key ZT1 and thus prepares a circuit for the feed magnet DZ1. This circuit is closed the instant a relay RU is energized over a line U1, and closes its contact ru. Over the line U1, a current impulse is transmitted every minute by a main clock which is not illustrated. The switch arm of the selector WZ1 is, therefore, advanced by one step every minute. As soon as the communication has been completed, the operator presses the key ZT2 and thus prepares a circuit for the perforating. This circuit is closed when the contact sp16 in the perforating device is closed, that is to say, when the column 16 of the perforated card is just under the plungers LR. The contacts of the selector WZ1 are connected to multiple lines to which the perforating plunger magnets LS are connected. Consequently, when closing the circuit by the key ZT2, there is energized the perforating magnet which corresponds to the unit value of the communication which has taken place.

From the values for the duration of the communication, the amount to be charged can be later transmitted automatically to the district of the calling and of the called subscriber. However, it is possible to directly effect the perforation of the card in accordance with this amount. For this purpose there is provided a register set, illustrated in Figure 10, consisting of the selectors WZ2 and WZ3. The selector WZ2 is again moved through one step by current impulses transmitted each minute over the line U2 and acting on a relay RU2 as soon as at the commencement of the communication the key ZT3 is pressed by the operator. The selector WZ2 is provided with three switch arms of which each serves for transmitting a position number of the value sum to be perforated. The perforation is to be effected at the termination of the communication or connection, for which purpose the key ZT4 is pressed, and thus there is closed the circuit for the feed magnets DZ3 of the selector WZ3, so long as the contact sp17 to sp22 is closed, that is to say, the perforated card is in the position in the perforating device in which the plungers are above the column 17. In the circuit is included a relay R1 which responds and energizes the relay S1. Relay S1 short circuits with its contact sl1, relay R1, thus amplifying the current for the feed magnet DZ3 in such a manner that this responds and moves the switch arm of the selector WZ3 through one step. The relays R1 and S1 operate as relay switches. At each step of the selector WZ3, a circuit is closed for a short time for actuating the perforating magnets through its switch arm by the contacts r12 and s12.

If, for example, the selector WZ2 has been advanced through three steps while communication was taking place, the switch arm a is set on the line of the multiple line to which the perforating magnet LS1 is connected, which carries out a perforation according to the value 1. The switch arm b is connected to the third line of the multiple line and the switch arm c with the fifth line of the multiple line, so that the values 1, 3, 5 are successively perforated which indicates that the amount for the communication amounts to 135 value units. The connection of the various contacts of the selector WZ2 can be varied according to the value of the separate communications. It is assumed, for example, that this counting register device is to be used in association with a series of lines over which communications which are always of the same value are produced, so that the value stage corresponding with the distance or zone is considered once and for all in these connections of the contacts of the selector WZ2 with the multiple line.

On the further movement of the selector WZ3, this moves over three further contacts which are directly connected to the perforating multiple and serve for example for transmitting the number of the operator's position to the perforated card. This perforation is effected in the columns 20 to 22.

In the arrangement as above described in connection with Figures 1 to 10, it is assumed that the production of the connection is effected manually by operators at separate operator's positions. In this case all the particulars regarding the connection are transmitted to the operator by the perforated card, so that errors in the reception of the otherwise orally transmitted communication are avoided. The operator is in a position also to enter the duration and the time period of the communication on the perforated card. It will be understood that still further entries can be made as, for example, the number of the communication line which is employed and which is for statistical purposes.

The application of the invention is not limited to installations wherein connection is produced manually. For example, the building up of connections in large automatic exchanges can be effected entirely automatically. Instead of separate operator's positions to which the perforated cards are distributed automatically by means of conveyor bands, there are then used transmitting and stacking devices at the separate connecting lines leading in the desired direction.

As soon as the connecting device becomes free, the next card is automatically removed from the stack and passed through the transmitting device which then effects the necessary transmission of current impulses corresponding with the perforations of the card for selecting the called subscriber and then transmits the necessary current impulses for selecting the calling subscriber. The card then passes into a perforating device which is connected to one of the counting register sets above described whereby the actuation of these counting register sets is effected automatically as is also the case in the usual counting arrangements.

The invention can also be used in those entirely automatic communicating points, in which the subscribers directly produce connection with the called subscribers by actuating their current impulse transmitter. In this case, the register selectors are constructed as simultaneous movement selectors which are also influenced by the transmitted current impulses in order to perforate the cards in accordance with the values of the connection which has been made. The recording of the number of the calling subscriber may in this case be effected automatically, for example, as in the entirely automatic telephone exchange.

The cards which after completion of the communication are provided with all the necessary particulars can then be considered from the various points of view automatically in tabulating machines. Thus, for example, it is possible to effect entirely automatically, after predetermined time intervals such as one month, a sorting of the cards according to the separate subscribers numbers, and then debiting the separate subscribers according to the communications which have taken place during the month.

It is also possible for statistical purposes to obtain for example an accurate survey regarding the traffic of separate lines and operating points. As all these calculations are made entirely automatically in the known sorting and tabulating machines, the use according to the invention of recording by means of perforated cards at connecting points for electric telephone connections has the advantage of effecting a considerable economy in time and personnel.

I claim:—

1. A toll telephone or the like exchange comprising in combination with incoming and outgoing lines, a recording device embodying perforator punches and electromagnets for actuating said punches; a register selector adapted to be set by current impulses and having fixed contacts; connections between said electromagnets of the perforator punches and the fixed contacts of said register selector; and means for closing a circuit over the switcharm of the register selector for actuating one of said perforator punches.

2. In a toll telephone or the like exchange including incoming and outgoing lines with means for connecting the same; a perforator device having punches and electromagnets for actuating said punches; register selectors having switch arms and fixed contacts; means for setting said register selectors one after another by current impulses; the said electromagnets of the perforator punches being connected to the fixed contacts of said register selectors; and means for closing current circuits over the switch arms of the register selectors for actuating the selected perforator punches one after another.

3. A toll telephone or the like exchange comprising in combination incoming lines provided with means for transmitting current impulses sent over the lines; a perforator device having punches and electromagnets for actuating said punches; register selectors having switcharms and fixed contacts; means for setting said register selectors one after another by the current impulses sent over the incoming lines; connections between said electromagnets of the perforator punches and the fixed contacts of the register selectors; a stepping selector embodying a switch arm and having fixed contacts connected with the switcharms of the register selectors; means for stepping up said stepping selector after the setting of the register selectors is accomplished; and means for connecting the switcharm of said stepping selector to a battery at each step of its operation for actuating the selected perforator punches one after another.

4. A toll telephone or the like exchange comprising in combination with incoming lines provided with means for transmitting current impulses sent over the lines, a perforator device having punches and electromagnets for actuating said punches: register selectors having switcharms and fixed contacts; means for setting said register selectors one after another by a series of current impulses sent over the incoming lines; a stepping selector also having a switcharm and fixed contacts; said electromagnets of the perforator punches being connected to the fixed contacts of the register selectors and to some of the fixed contacts of said stepping selector, and the remaining fixed contacts of said stepping selector being connected to the switcharms of said register selectors; means for setting the stepping selector by current impulses sent over the incoming lines up to one of the contacts connected with one of the electromagnets of said perforator device; means for stepping up said stepping selector after setting the same by such current impulses; and means for connecting the switcharm of the stepping selector to a battery at each step of its operation for actuating the selected perforator punches one after another.

5. In a toll telephone or the like exchange having incoming lines provided with means for transmitting current impulses sent over the lines, a perforator device embodying punches and electromagnets for actuating said punches; register selectors having switcharms and fixed contacts; means for setting said register selectors one after another by a series of said current impulses sent over the incoming lines; a stepping selector also having fixed contacts and a switcharm; said electromagnets of the perforator punches being connected to the fixed contacts of the register selectors and to some of the fixed contacts of said stepping selector, and the remaining fixed contacts of said stepping selector being connected to the switcharms of the register selectors; means for setting the stepping selector by current impulses sent over the lines up to one of the contacts connected with one of the electromagnets of said perforator device; means for holding the register selectors independently of the operations of the incoming lines after the setting of said stepping selector by the current impulses sent over said lines; means for stepping up said stepping selector after setting the same by such current impulses; and means for connecting the switcharm of the stepping selector to a battery at each step of its operation for actuating the selected perforator punches one after another.

6. A toll telephone or the like exchange, comprising in combination with incoming lines and associated means for transmitting current impulses sent thereover, a perforator device embodying punches and electromagnets for actuating said punches; register selectors adapted to be set by a series of current impulses sent over the incoming lines and having switcharms and fixed contacts; a distributing selector for distributing the series of current impulses one after another to the several register selectors; a stepping selector having fixed contacts and a switcharm; said electromagnets of the perforator punches being connected to the fixed contacts of the register selectors and to some of the fixed contacts of said stepping selector, and the remaining fixed contacts of said stepping selector being connected to the switcharms of the register selectors; means for distributing the last series of current impulses sent over the line to the stepping selector; and means for stepping up the stepping selector after setting the same by current impulses sent over the lines, the said stepping means connecting a battery to the switcharm of the stepping selector at each of its operative steps for actuating the selected perforator punches one after another.

7. A toll telephone or the like exchange, comprising in combination with incoming lines having associated means for transmitting current impulses sent thereover and means for repeating electrical speech waves, a perforator device embodying punches and electromagnets for actuating said punches; register selectors having switcharms and fixed contacts; means for setting said register selectors one after another by the current impulses sent over the incoming lines; said electromagnets of the perforator punches being connected to the fixed contacts of a first contact row of the register selectors; a phonetical device for transmitting electrical speech waves corresponding to numerals including repeating coils; the said repeating coils being connected to the fixed contacts of a second contact row of the register selectors; means for connecting the second row switcharms of the register selectors one after another with the repeater means of the incoming lines; and means for closing the current circuits over the first row switcharms of the register selectors for actuating the selected perforator punches one after another.

8. A toll telephone or the like exchange including in combination with incoming lines having means for transmitting current impulses sent thereover, a perforator device embodying punches, electromagnets for actuating the punches, perforator cards and contact means operated in distinctive positions of a perforator card; a plurality of sets of register selectors adapted to be set by current impulses and having fixed contacts and switcharms; the perforator electromagnets being connected to the fixed contacts of said register selectors of all sets; and means for actuating the perforator punches selected by the switcharms of the register selectors of one set, the said actuating means being dependent upon said contact means of the perforator device allowing actuation of the perforator punches only when the perforator card is in proper position.

9. A toll telephone or the like exchange including in combination with incoming lines having means for transmitting series of current impulses sent thereover, a perforator device embodying punches, electromagnets for actuating the punches, perforator cards and means for moving the perforator cards stepwise; register selectors having selector switcharms movable over fixed contacts; means for setting the register selectors by current impulses sent over the lines; said perforator electromagnets being connected to the fixed contact of the register selectors; means for actuating the perforator electromagnets selected by the switcharms of the register selectors one after another; positions of operator controls; means at the operator's positions for connecting the incoming lines with outgoing lines of definite destination; a device for conveying the cards which are perforated by the register device to the operator's positions; and a receiving device at each operator's position adapted to receive the cards conveyed by said conveying device; the said receiving devices being automatically controllable by the setting of one of the register selectors.

10. A toll telephone or the like exchange including in combination with the usual incoming and outgoing lines and means for transmitting series of current impulses sent over the incoming lines, a perforator device embodying card punches, electromagnets for actuating the punches; perforator cards and means for moving the perforator cards step by step; sets of register selectors associated with the incoming lines and adapted to be set by current impulses sent over the associated lines, said selectors having selector switcharms movable over fixed contacts and the perforator electromagnets being connected with said contacts of the selectors of all sets; means for actuating the perforator electromagnets selected by the switcharms of the register selectors one after another; contact means in the perforator device allowing actuation of the perforator electromagnets over the switcharms of the register selectors only of one set simultaneously, said contact means serving to influence the actuating means; operator's positions including means for connecting the incoming lines to outgoing lines, one of said operator's position being associated with each direction of outgoing lines; a device for conveying the perforator cards after perforation to the operator's position, including receiving devices at each operator's position; and means for controlling said receiving devices in accordance with the setting of one of the register selectors belonging to that register selector set, the setting of which has actuated the perforation of the card to be conveyed.

11. A toll telephone or like exchange including in combination with incoming and outgoing lines and associated means for transmitting series of current impulses sent over the lines, a perforator device embodying card punches, electromagnets for actuating the punches; perforator cards and means for moving the cards step by step; register selectors associated with the incoming lines and having selector switcharms movable over fixed contacts; means for setting the register selectors by current impulses sent over the lines; said perforator electromagnets being connected with the fixed contacts of the register selectors; means for actuating the perforator electromagnets selected by the register selectors one after another; operator's positions including means for connecting the incoming lines to outgoing lines and an impulse transmitter adapted to transmit current impulses over an outgoing line corresponding to the perforations of a perforator card; a device for conveying the cards which are perforated by the perforator device to the operator's positions; and a receiving device at each operator's position adapted to receive the cards conveyed by said conveying device, the said receiving devices being automatically controllable by the setting of one of the register selectors.

FRITZ RUMPF.